United States Patent
Seo et al.

(10) Patent No.: US 11,467,452 B2
(45) Date of Patent: Oct. 11, 2022

(54) SUBSTRATE

(71) Applicant: LG Chem, Ltd., Seoul (KR)

(72) Inventors: Han Min Seo, Daejeon (KR); Ji Young Hwang, Daejeon (KR); Hyeon Choi, Daejeon (KR); Seung Heon Lee, Daejeon (KR); Dong Hyun Oh, Daejeon (KR); Jung Sun You, Daejeon (KR); Cheol Ock Song, Daejeon (KR); Nam Seok Bae, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 16/633,289

(22) PCT Filed: Jul. 27, 2018

(86) PCT No.: PCT/KR2018/008551
§ 371 (c)(1),
(2) Date: Jan. 23, 2020

(87) PCT Pub. No.: WO2019/022565
PCT Pub. Date: Jan. 31, 2019

(65) Prior Publication Data
US 2020/0150478 A1    May 14, 2020

(30) Foreign Application Priority Data

Jul. 27, 2017 (KR) .................. 10-2017-0095464
Jul. 26, 2018 (KR) .................. 10-2018-0087288

(51) Int. Cl.
*G02F 1/1339* (2006.01)

(52) U.S. Cl.
CPC ...... *G02F 1/13392* (2013.01); *G02F 2201/56* (2013.01)

(58) Field of Classification Search
CPC ................................................. G02F 1/13392
See application file for complete search history.

(56) References Cited

U.S. PATENT DOCUMENTS

| 6,377,328 B1 | 4/2002 | Morimoto et al. |
| 8,866,980 B2 | 10/2014 | Inoue et al. |
(Continued)

FOREIGN PATENT DOCUMENTS

| CN | 101180568 A | 5/2008 |
| CN | 102681180 A | 9/2012 |
(Continued)

OTHER PUBLICATIONS

Search report from International Application No. PCT/KR2018/008551, dated Oct. 30, 2018.
(Continued)

*Primary Examiner* — Edmond C Lau
(74) *Attorney, Agent, or Firm* — Lerner, David, Littenberg, Krumholz & Mentlik, LLP

(57) ABSTRACT

A substrate on which spacers are disposed in a certain arrangement state and an optical device using such a substrate are provided. A plurality of spacers are irregularly disposed on a substrate depending on a predetermined rule, so that overall uniform optical characteristics can be ensured without causing a so-called moire phenomenon or the like, while the spacers maintain the uniform cell gap in the construction of the optical device.

17 Claims, 25 Drawing Sheets

(56) References Cited

U.S. PATENT DOCUMENTS

| | | |
|---|---|---|
| 2003/0071959 A1 | 4/2003 | Koyama |
| 2012/0236237 A1* | 9/2012 | Kanari ............... G02F 1/13392 349/110 |
| 2012/0268671 A1 | 10/2012 | Inoue et al. |
| 2014/0293173 A1 | 10/2014 | Koito et al. |
| 2015/0362741 A1 | 12/2015 | Oh et al. |

FOREIGN PATENT DOCUMENTS

| | | |
|---|---|---|
| CN | 102998873 A | 3/2013 |
| EP | 0022311 A1 | 1/1981 |
| EP | 3358400 A1 | 8/2018 |
| EP | 3647862 A1 | 5/2020 |
| JP | 2002221722 A | 8/2002 |
| JP | 2005017494 A | 1/2005 |
| JP | 2012194257 A | 10/2012 |
| JP | 2012234142 A | 11/2012 |
| JP | 5923456 B2 | 5/2016 |
| JP | 6004127 B1 | 10/2016 |
| KR | 20120105357 A | 9/2012 |
| KR | 20120120017 A | 11/2012 |
| KR | 20150079207 A | 7/2015 |
| KR | 20150142891 A | 12/2015 |
| WO | 2017057619 A1 | 4/2017 |

OTHER PUBLICATIONS

Search report from Office Action from TW 20180125949 dated May 23, 2019.
Extended European Search Report including Written Opinion for Application No. EP18838533.0 dated May 20, 2020, 9 pgs.
Search Report dated Mar. 2, 2022 from Office Action for Chinese Application No. 201880050289.4 dated Mar. 9, 2022. 2 pgs.

* cited by examiner

[Figure 1]
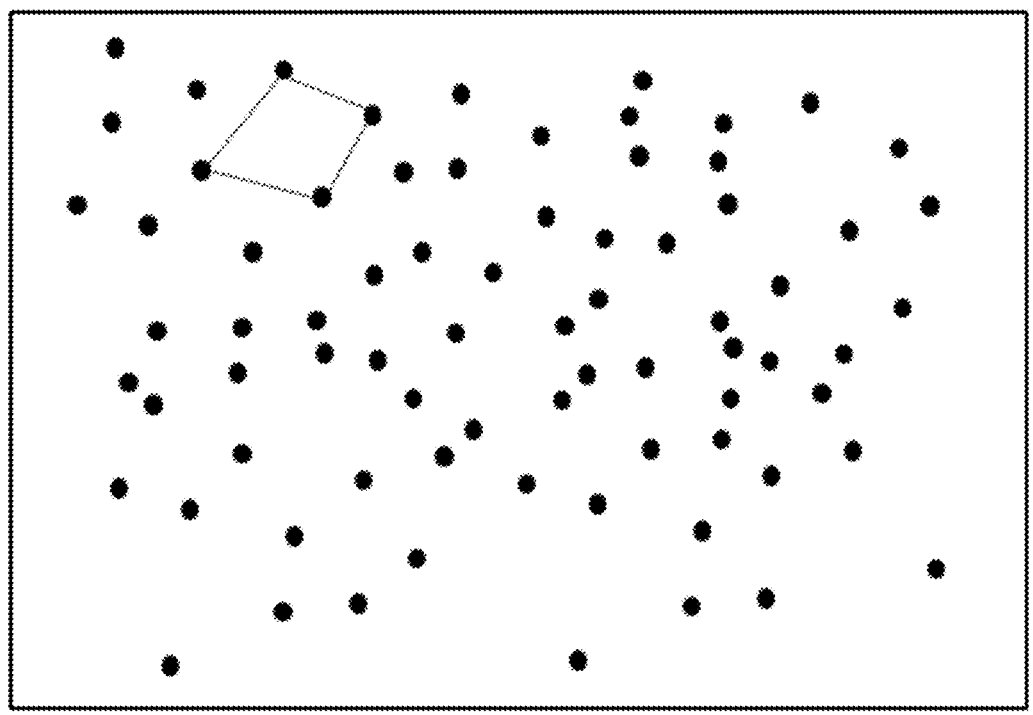

[Figure 2]
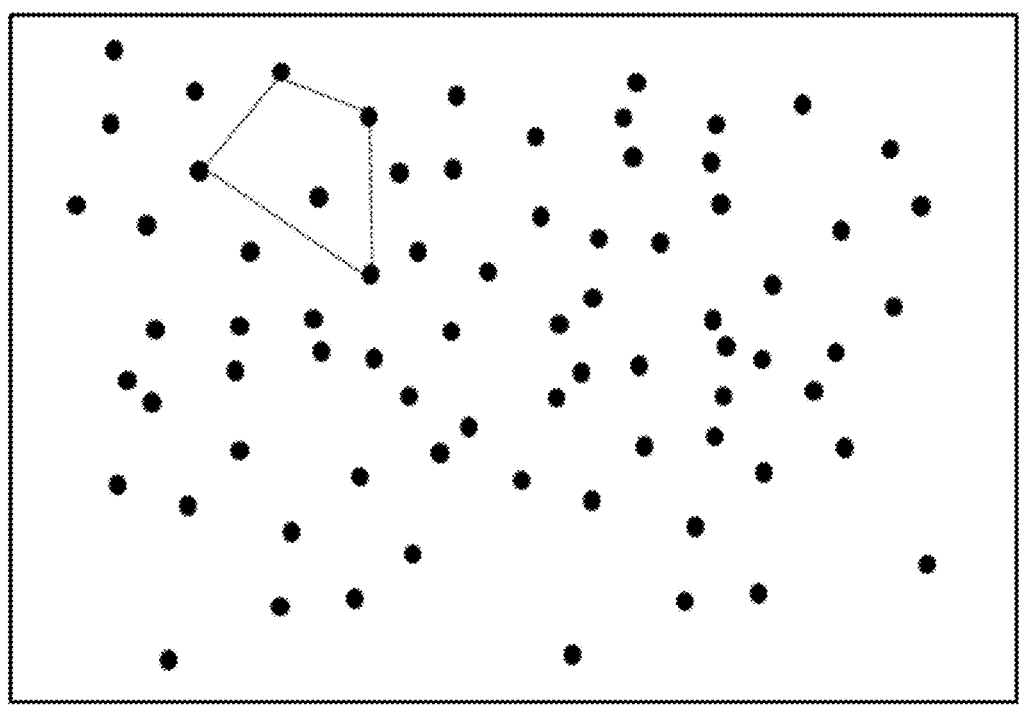

[Figure 3]
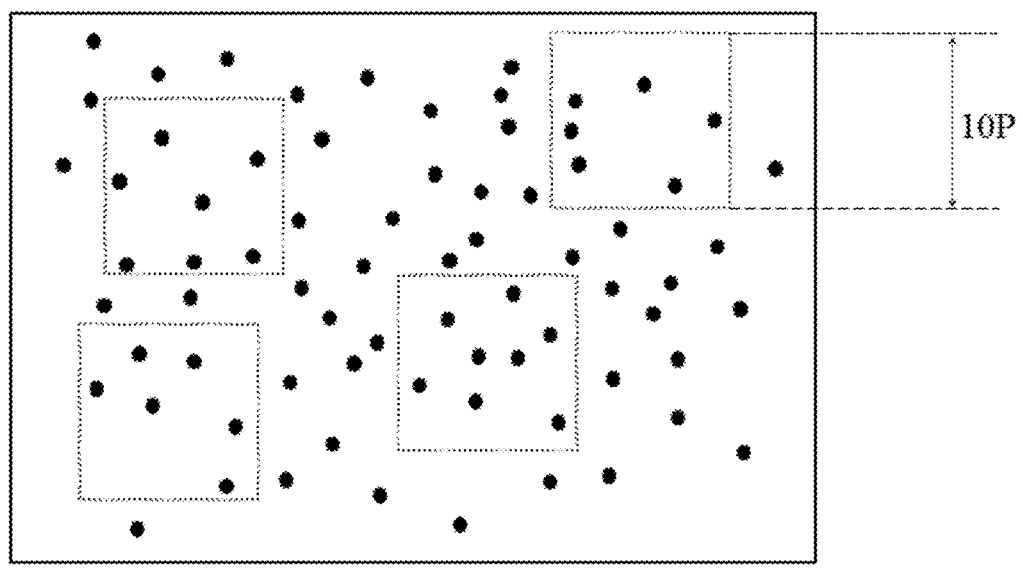

[Figure 4]
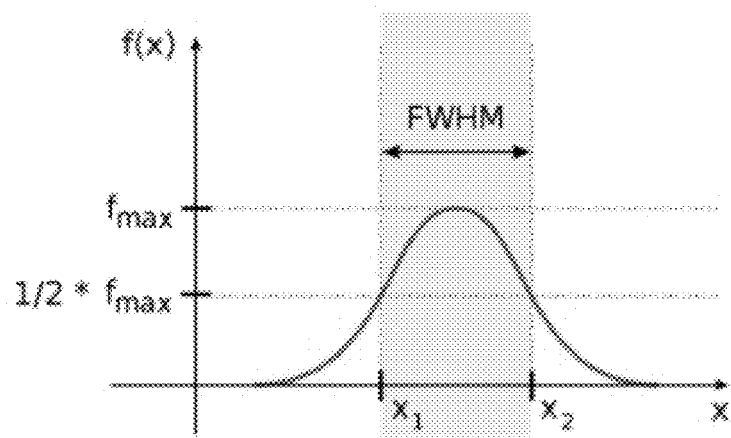

[Figure 5]
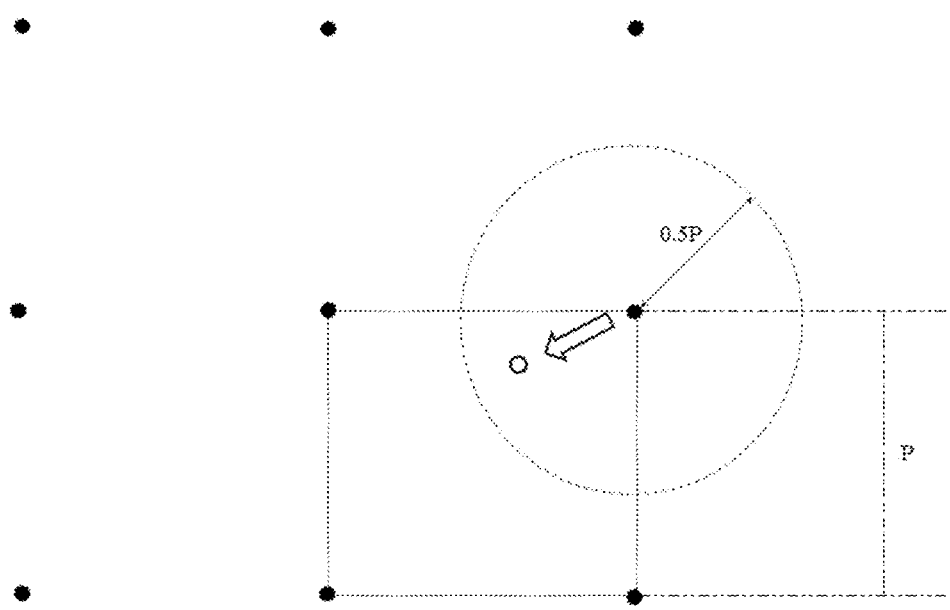

[Figure 6]
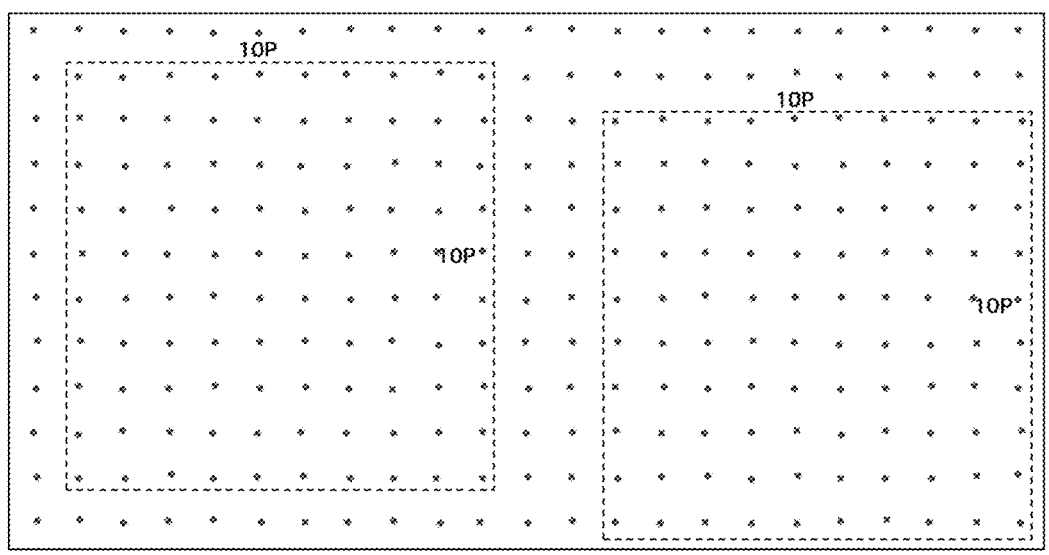

[Figure 7]
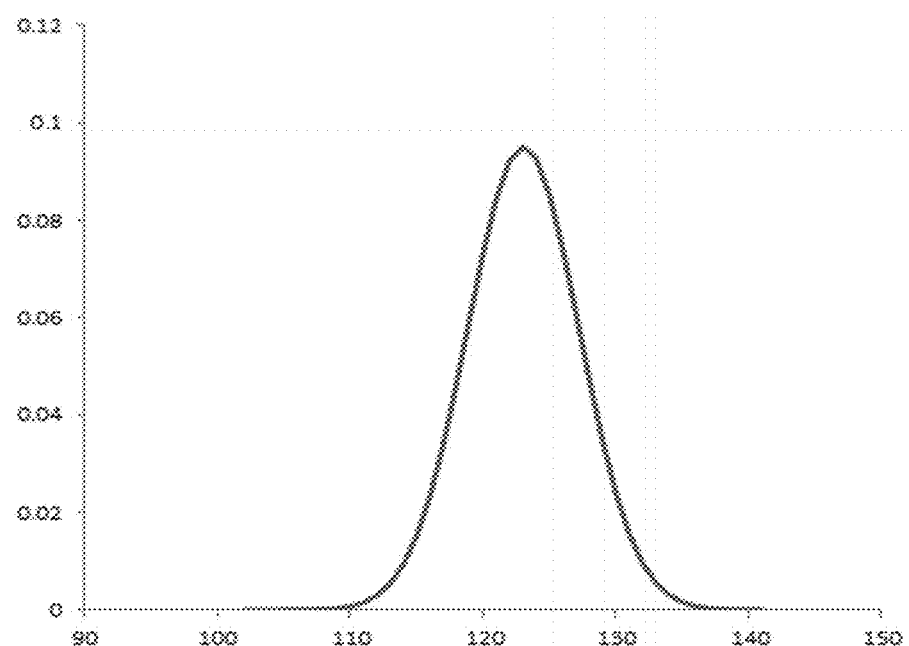

[Figure 8]
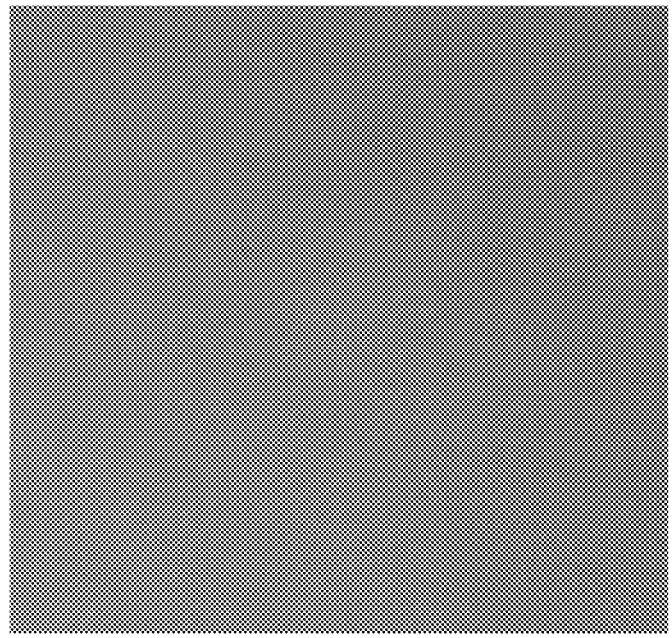

[Figure 9]
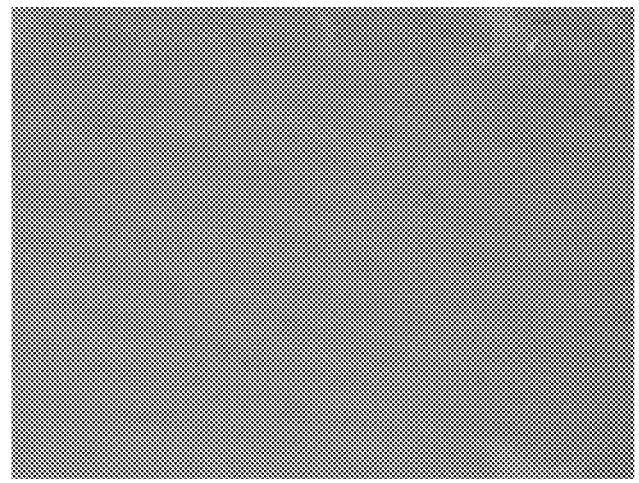

[Figure 10]
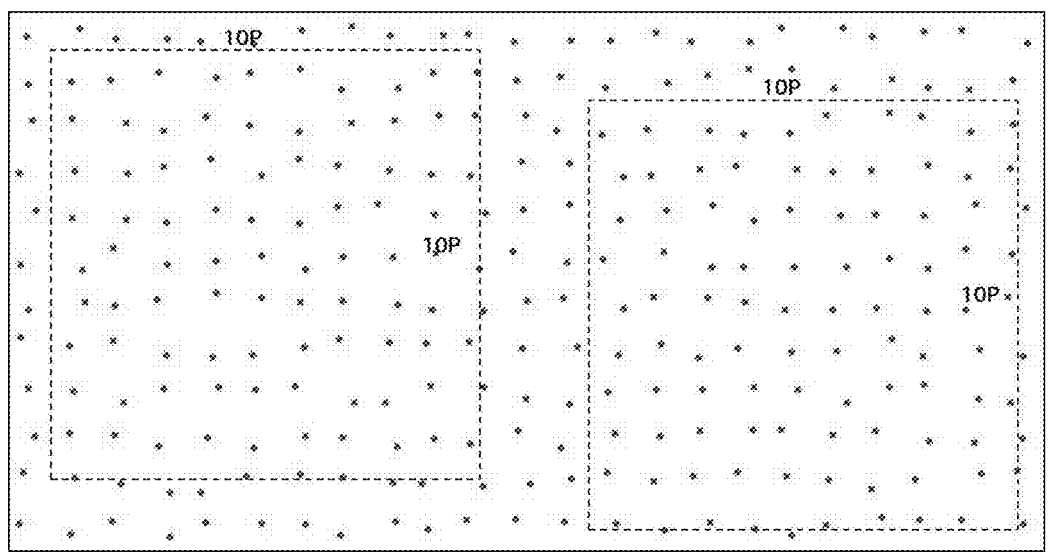

[Figure 11]
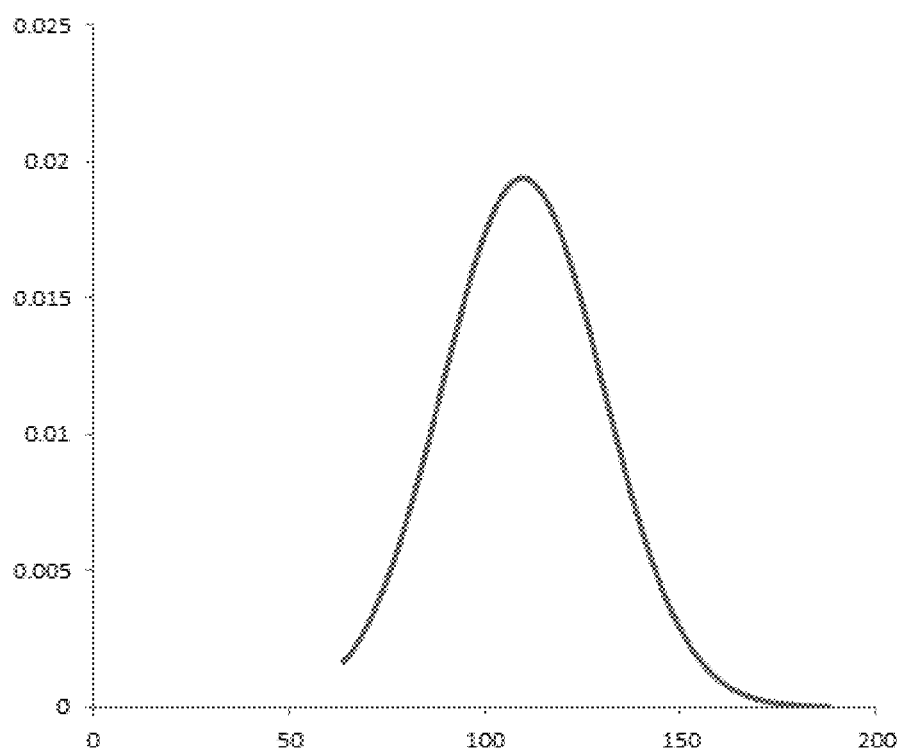

[Figure 12]
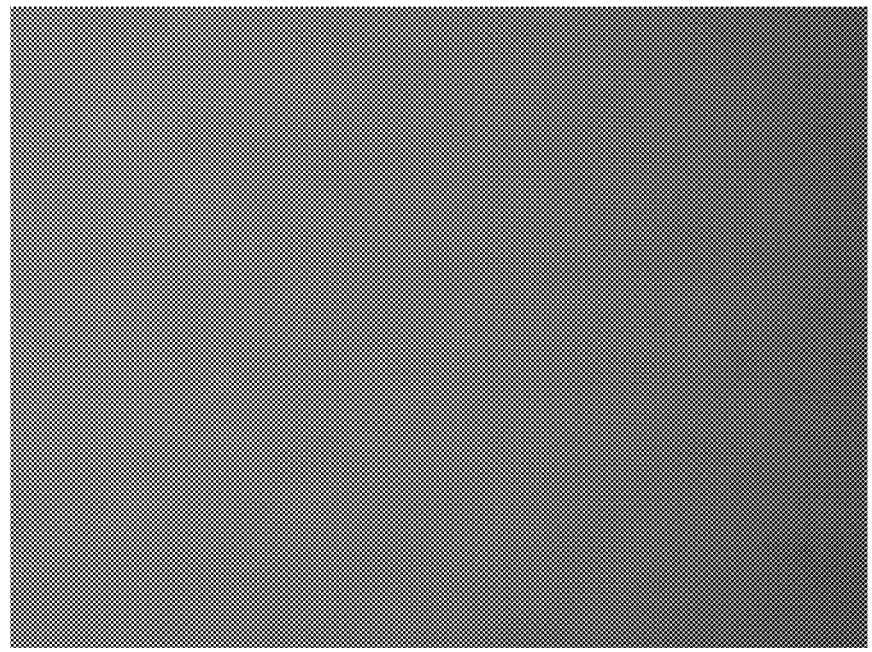

[Figure 13]
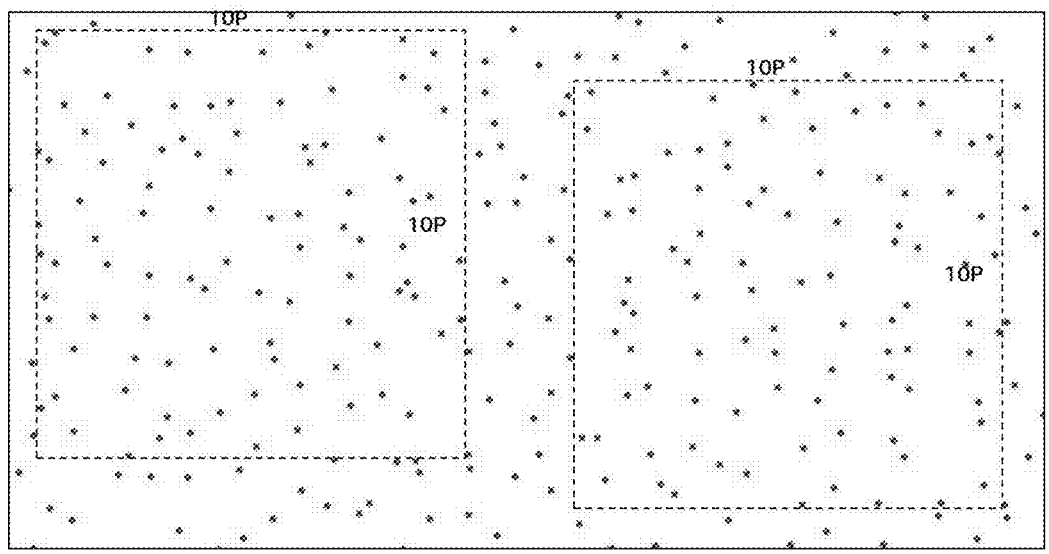

[Figure 14]
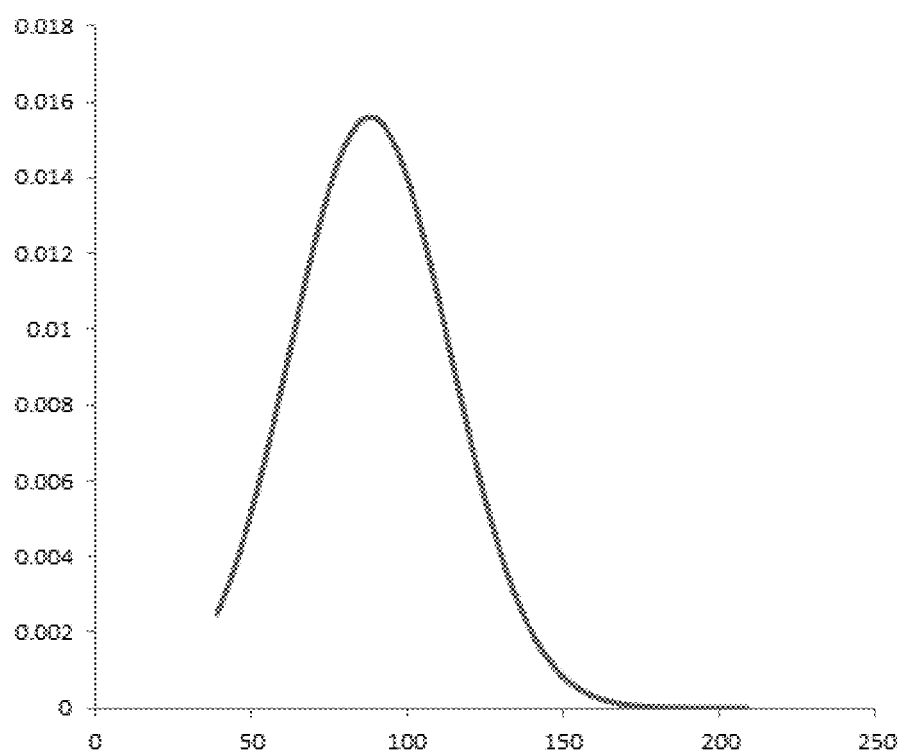

[Figure 15]
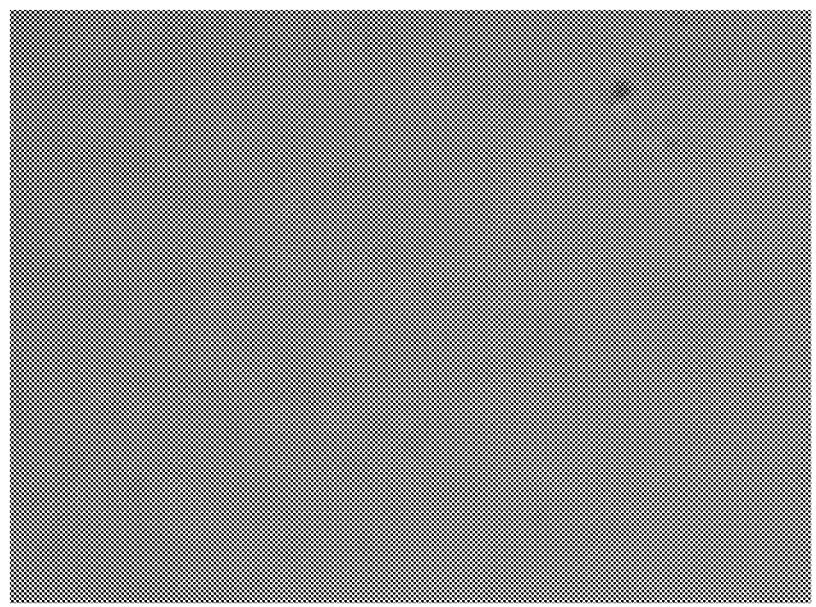

[Figure 16]
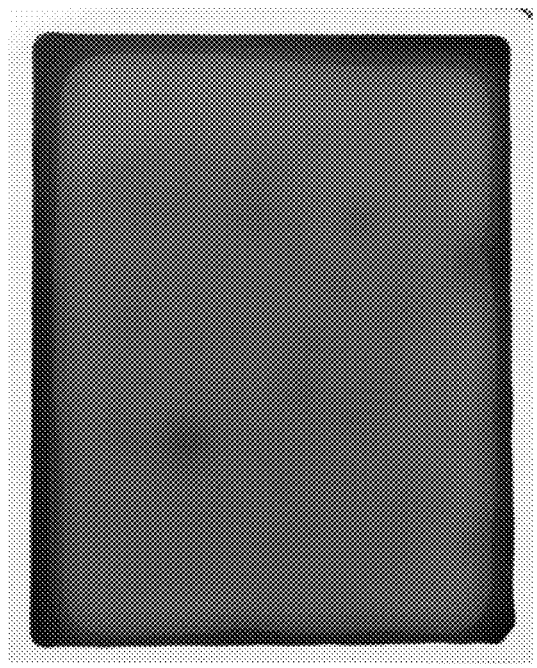

[Figure 17]
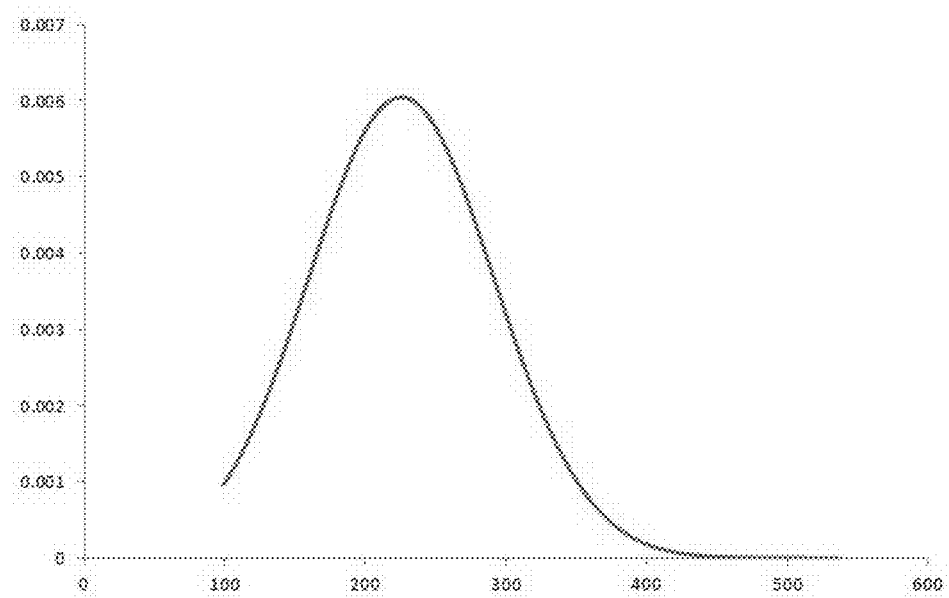

[Figure 18]
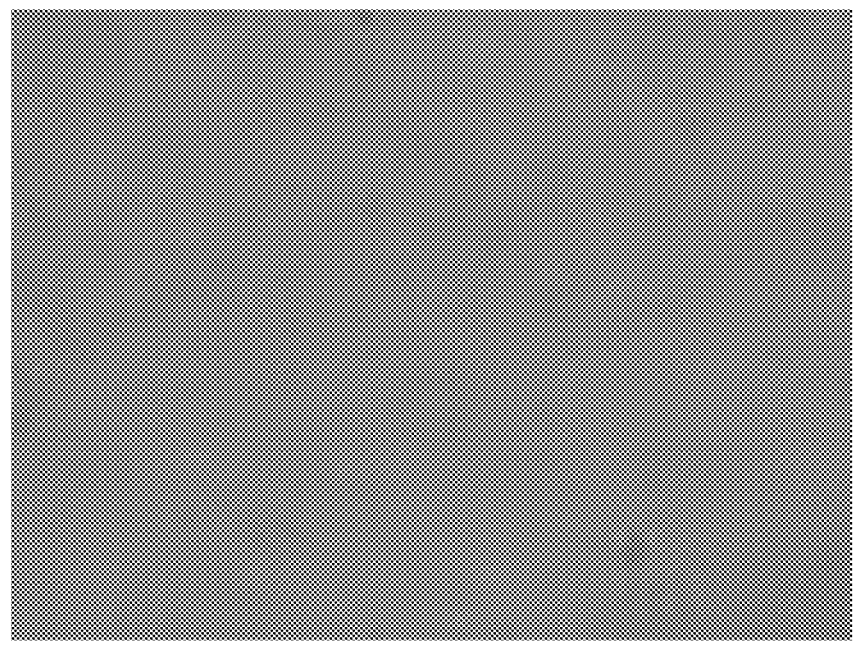

[Figure 19]
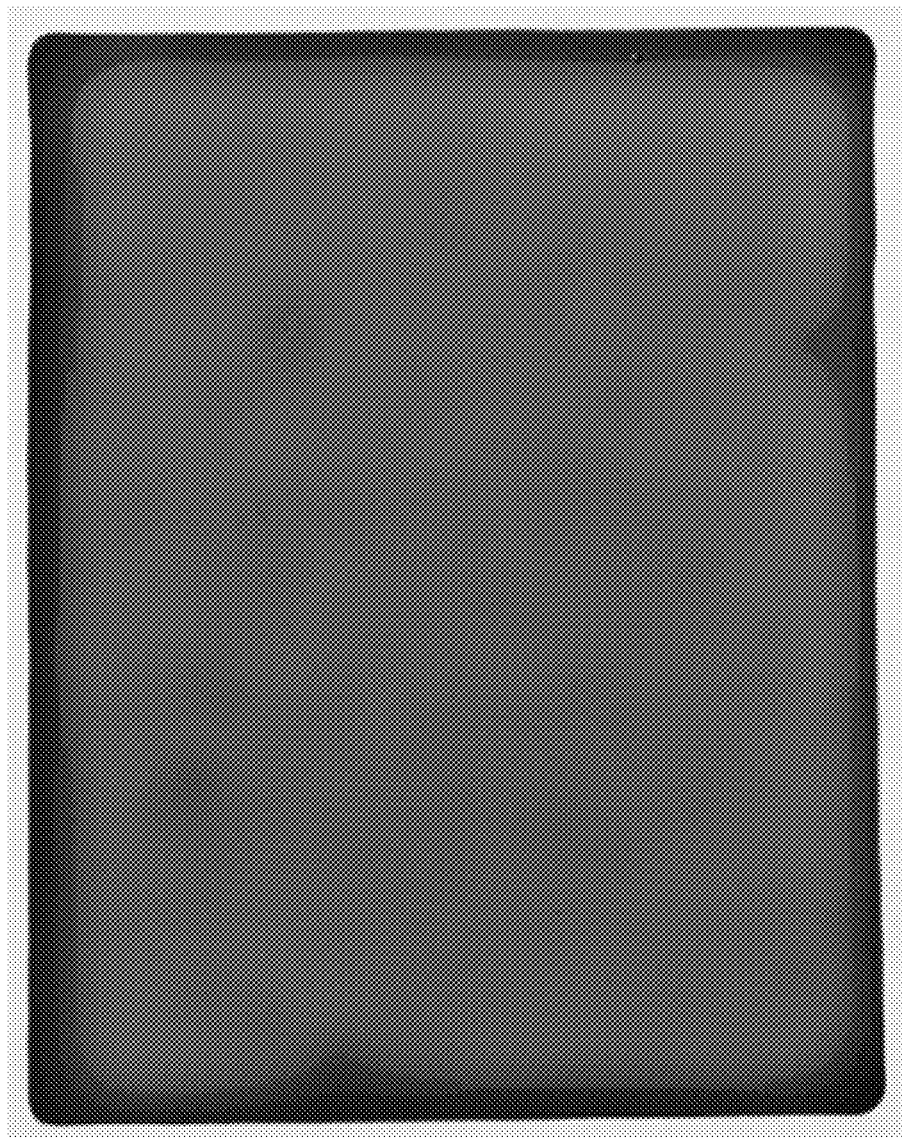

[Figure 20]
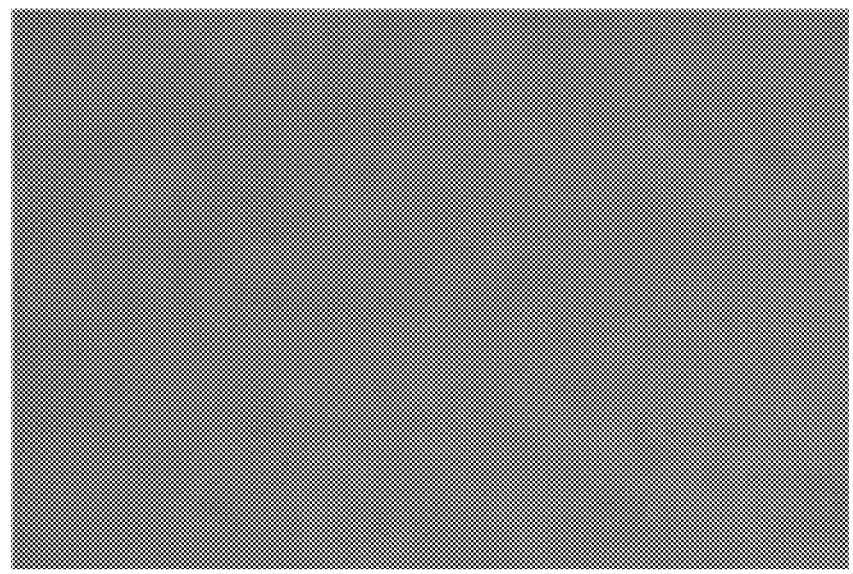

[Figure 21]
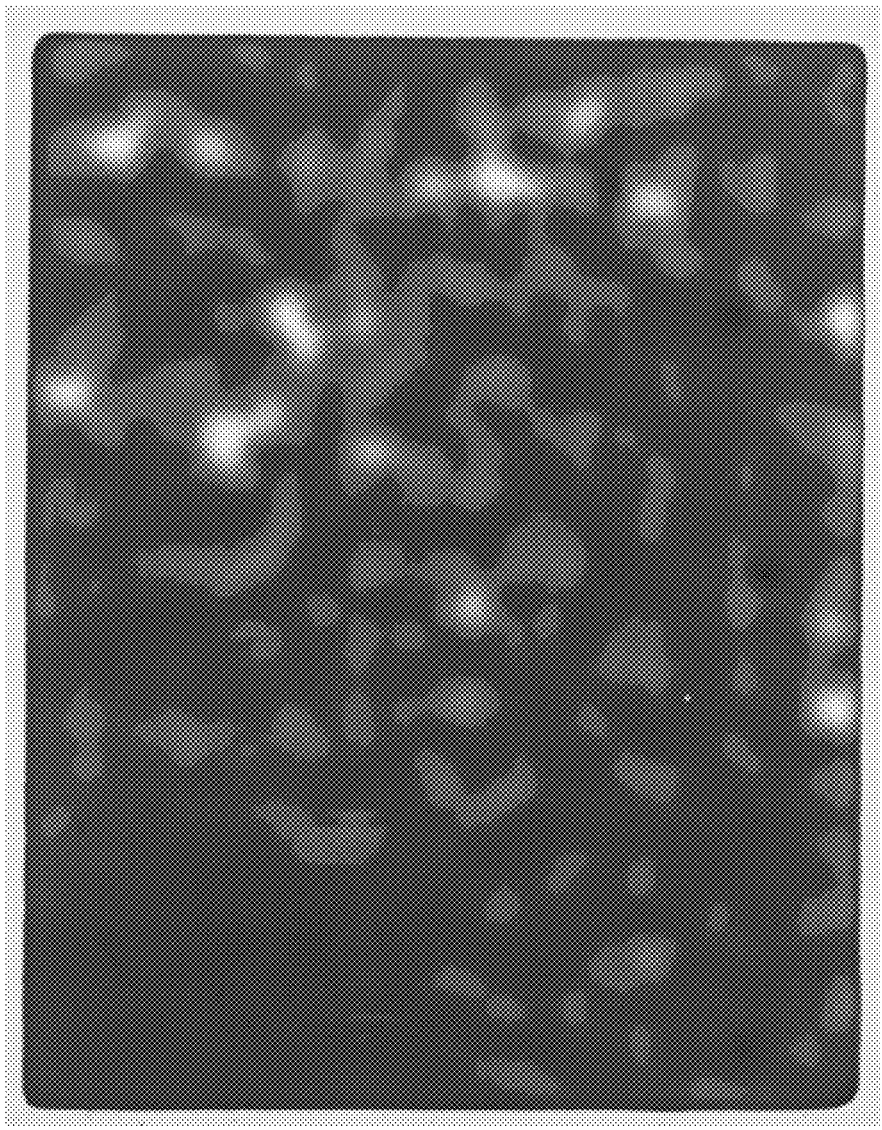

[Figure 22]
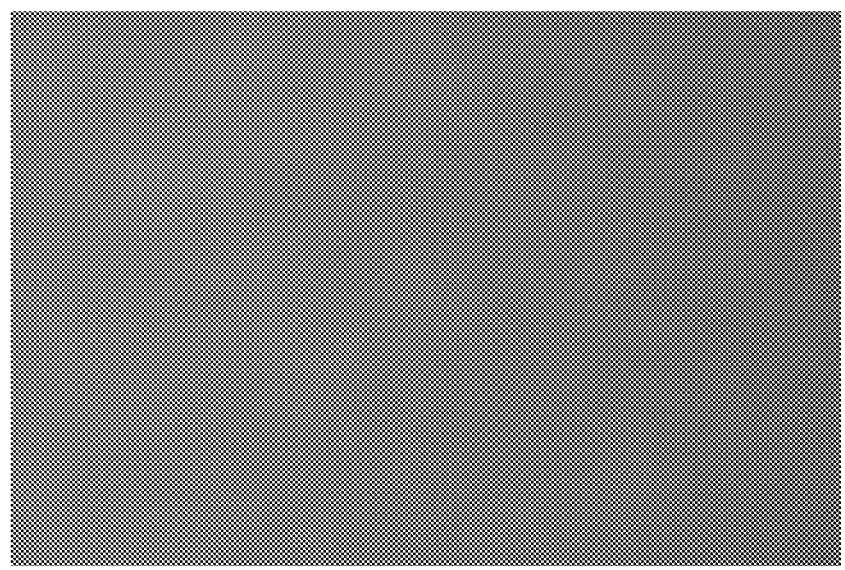

[Figure 23]
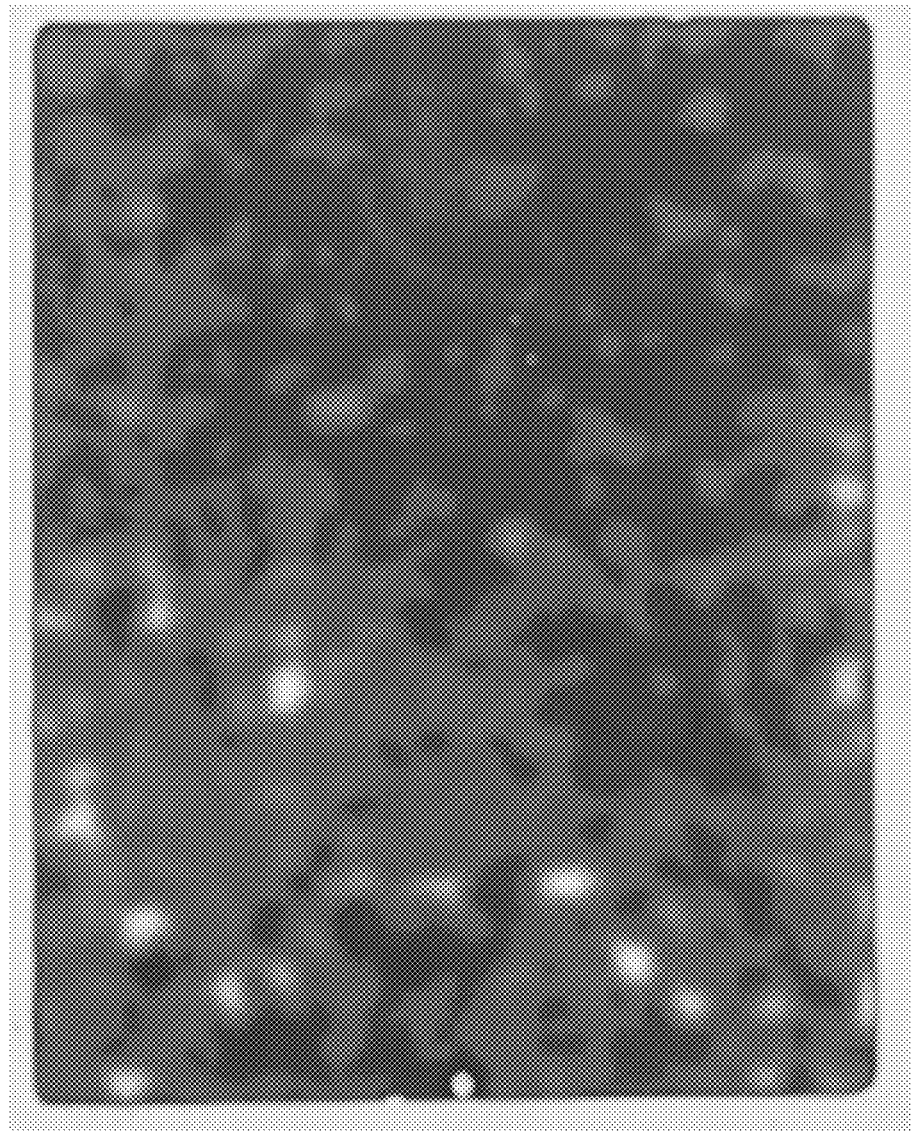

[Figure 24]
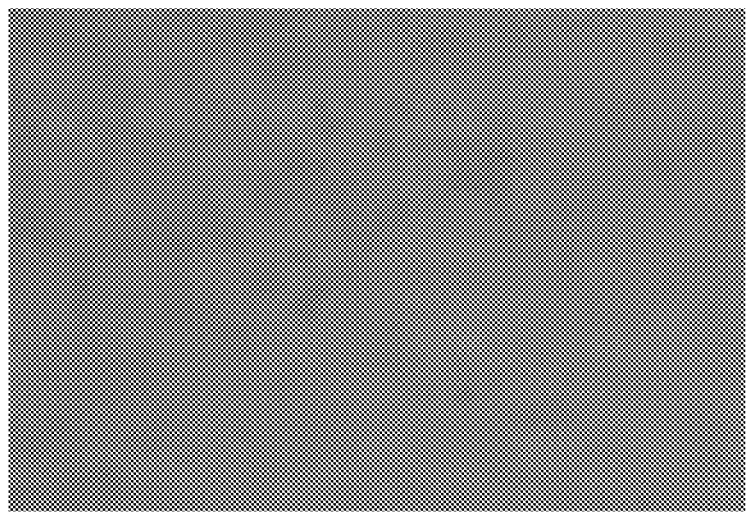

[Figure 25]
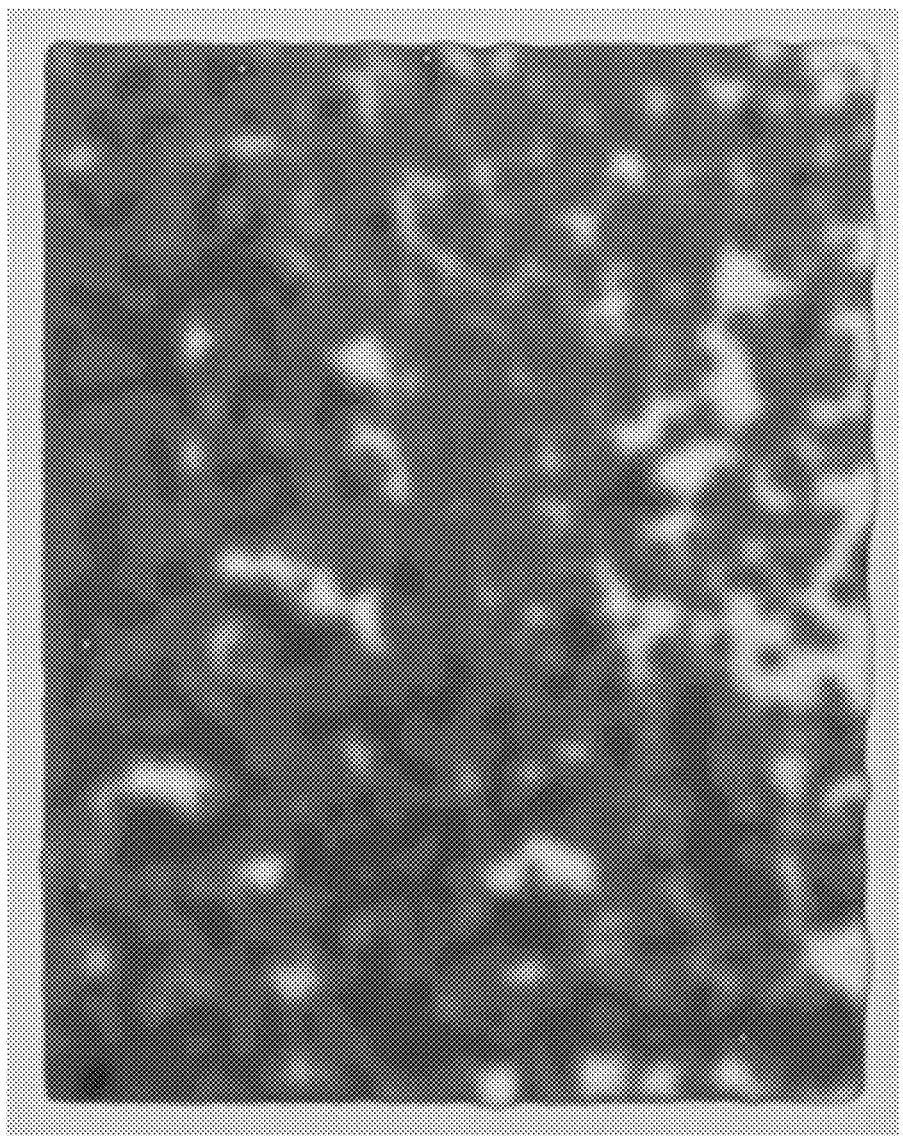

SUBSTRATE

CROSS-REFERENCE TO RELATED APPLICATIONS

This application is a national phase entry under 35 U.S.C. § 371 of International Application No. PCT/KR2018/008551 filed Jul. 27, 2018, which claims priority from Korean Patent Application No. 10-2017-0095464 filed on Jul. 27, 2017 and Korean Patent Application No. 10-2018-0087288 filed on Jul. 26, 2018, the disclosures of which are incorporated herein by reference in their entirety.

TECHNICAL FIELD

The present application relates to a substrate.

BACKGROUND ART t

An optical device capable of adjusting transmittance or color of light by disposing a light modulation layer between two substrates is known. For example, in Patent Document 1, a so-called GH cell (guest host cell) to which a mixture of a liquid crystal host and a dichroic dye guest is applied is known.

In such a device, so-called spacers are located between the substrates to maintain the spacing between the two substrates.

PRIOR ART DOCUMENTS

Patent Documents

Patent Document 1: European Patent Publication No. 0022311

DISCLOSURE

Technical Problem

The present application relates to a substrate, for example, a substrate comprising spacers. In the present application, it is one object to provide a substrate on which spacers can be irregularly disposed while having regularity and irregularity simultaneously to provide an optical device that a so-called moire phenomenon or the like does not occur and uniform optical characteristics are exhibited in all regions.

Technical Solution

Among physical properties mentioned in this specification, when the measured temperature affects the results, the relevant physical properties are physical properties measured at room temperature, unless otherwise specified. The term room temperature is a natural temperature without being heated or cooled, which may be, for example, any temperature in a range of 10° C. to 30° C., or about 23° C. or about 25° C. or so. In addition, unless otherwise specified herein, the unit of temperature is ° C.

Among physical properties mentioned in this specification, when the measured pressure affects the results, the relevant physical properties are physical properties measured at room pressure, unless otherwise specified. The term normal pressure is a natural pressure without being pressurized or depressurized, where usually about 1 atm is referred to as the normal pressure.

The substrate of the present application comprises a base layer and spacers present on the base layer.

As the base layer, any base layer used in a substrate in a configuration of a known optical device such as, for example, an LCD (liquid crystal display) can be applied without particular limitation. For example, the base layer may be an inorganic base layer or an organic base layer. As the inorganic base layer, a glass base layer or the like can be exemplified, and as the organic base layer, various plastic films or the like can be exemplified. The plastic film can be exemplified by a TAC (triacetyl cellulose) film; a COP (cycloolefin copolymer) film such as a norbornene derivative; an acrylic film such as PMMA (poly(methyl methacrylate); a PC (polycarbonate) film; a polyolefin film such as PE (polyethylene) or PP (polypropylene); a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenemaphthatate) film; a PET (polyethyleneterephtalate) film; a PI (polyimide) film; a PSF (polysulfone) film or a PAR (polyarylate) film, and the like, but is not limited thereto.

In the substrate of the present application, the thickness of the base layer is also not particularly limited, where an appropriate range may be selected depending on applications.

In the substrate of the present application, a plurality of spacers is present on the base layer. The spacer may be fixed to the base layer. In this case, the spacer may be fixed directly in contact with the base layer, or if there are other layers between the base layer and the spacer, it may be fixed on the relevant other layer. The kind of the other layer includes a known layer necessary for driving the optical device, and for example, there is an electrode layer to be described below.

The plurality of spacers is disposed on the base layer while having predetermined regularity and irregularity simultaneously. Specifically, at least a part of the plurality of spacers on the base layer are in an irregular arrangement in terms of being arranged so as to have pitches different from each other, but are regular in terms of being arranged with substantially the same density between regions determined according to a predetermined rule.

As described above, in the substrate of the present application, at least a part of the spacers disposed on the base layer are disposed so as to have pitches different from each other.

Here, when a part of the plurality of spacers have been selected so as to form a closed figure in a state where other spacers are not present therein, the term pitch can be defined as a length of a side of the closed figure. In addition, unless otherwise specified, the unit of the pitch is μm.

In one example, the length of the side of the closed figure may be at most 600 μm or so. In another example, the maximum length of the lengths of the sides of the closed figure may be about 550 μm or less, about 500 μm or less, about 450 μm or less, or about 400 μm or less, or may be about 300 μm or more, 350 μm or more, or 400 μm or more.

In addition, the minimum length of the lengths of the sides of the closed figure may be about 10 μm or more. In another example, the minimum length of the lengths of the sides of the closed figure may be about 100 μm or less, about 90 μm or less, about 80 μm or less, about 70 μm or less, or about 65 μm or less, or may be about 20 μm or more, 30 μm or more, or 40 μm or more.

When the substrate of the present application has been applied to a product through the above spacing arrangement, a cell gap of the element can be stably maintained and it can be prevented to cause appearance defects such as stains.

The maximum or minimum length can be obtained by using a known random number coordinate program, for example, a CAD, MATLAB or STELLA random number coordinate program or the like.

The closed figure thus formed may be a triangle, a quadrangle or a hexagon. That is, when three spacers among the plurality of spacers have been optionally selected and connected to each other, the triangle is formed; when four spacers have been selected and connected to each other, the quadrangle is formed; and when six spacers have been selected and connected, the hexagon is formed.

FIG. 1 is an example of a quadrangle which is a closed figure formed by optionally selecting four spacers among the spacers (black dots) existing on the base layer and connecting them by imaginary lines (dotted lines). However, upon determining the pitch, the closed figure thus formed is formed such that no spacer is present therein. Therefore, for example, in the case where spacers are formed such that another spacer is present therein, as in FIG. 2, they are excluded when determining the pitch.

In one example, the ratio (%) of the number of sides having the same length among sides of a triangle, a quadrangle or a hexagon, which is a closed figure thus formed (100×(number of sides of the same length)/3 in the case of a triangle, 100×(number of sides of the same length)/4 in the case of a hexagon, and 100×(number of sides of the same length)/6 in the case of a hexagon) can be 85% or less. In another example, the ratio may be 84% or less, 80% or less, 76% or less, 67% or less, 55% or less, or 40% or less. The lower limit of the ratio is not particularly limited. That is, in some cases, since the lengths of all sides of the closed figure may not be the same, the lower limit of the ratio may be 0%.

As described above, the arrangement of the spacers of the present application is irregular in that at least a part thereof has different pitches, but such irregularity is controlled under certain regularity. Here, the regularity may mean that the arrangement density of spacers is substantially close to each other between certain regions.

For example, if the normal pitch of the plurality of irregularly arranged spacers is P, when two or more square regions with 10 P as a length of one side have been optionally selected on the surface of the base layer, the standard deviation of the number of spacers present in each square region is 2 or less.

FIG. 3 is a view exemplarily showing a case where four square regions (dotted rectangular regions in FIG. 3) with 10 P as the length of one side are optionally selected.

Here, the term normal pitch means a distance between the centers of adjacent spacers in a state where the plurality of spacers, in actuality, irregularly disposed on the base layer are placed so that all of the spacers are virtually disposed at the same pitch in consideration of the number of the spacers and the area of the base layer.

The manner to confirm a virtual state where all of the above-mentioned spacers are disposed so as to have the same pitch is known, which can be achieved by using a random number generating program such as, for example, CAD, MATLAB, STELLA or Excel.

The standard deviation is a numerical value representing a degree of scattering of the number of the spacers, which is a numerical value determined by a positive square root of dispersion.

That is, when at least two or more of the rectangular regions have been optionally designated on the surface of the base layer that spacers are formed thereon and then the standard deviation of the numbers of spacers existing in the regions has been obtained, the standard deviation is 2 or less. In another example, the standard deviation may be 1.5 or less, 1 or less, or 0.5 or less. In addition, the standard deviation means that the lower the numerical value is, the desired regularity is achieved, and thus the lower limit is not particularly limited, which may be 0, for example.

Here, the number of the designated rectangular regions is not particularly limited as long as it is 2 or more, but in one example, it may be selected as the number that the rectangular regions are optionally selected so as not to overlap each other on the surface of the base layer, provided that the area occupied by the optionally selected regions is about 10% or more, 20% or more, 30% or more, 40% or more, 50% or more, 60% or more, 70% or more, 80% or more, or 90% or more of the total area of the base layer.

The range of the normal pitch (P) forming one side of the arbitrary rectangular region can be determined by the number of spacers present on the base layer and the area of the relevant base layer, as described above, which is not particularly limited, and usually, it may be in a range of 50 μm to 1,000 μm. In another example, the normal pitch (P) may be about 60 μm or more, 70 μm or more, 80 μm or more, 90 μm or more, 100 μm or more, or 110 μm or more, and may also be about 900 μm or less, 800 μm or less, 700 μm or less, 600 μm or less, 500 μm or less, 400 μm or less, 300 μm or less, 200 μm or less, or 150 μm or less.

Although not particularly limited, the average number of spacers present in optionally selected square regions as above may be, for example, about 80 to 150 or so. In another example, the average number may be 82 or more, 84 or more, 86 or more, 88 or more, 90 or more, 92 or more, 94 or more, 96 or more, or 98 or more. Also, in another example, the average number may be 148 or less, 146 or less, 144 or less, 142 or less, 140 or less, 138 or less, 136 or less, 134 or less, 132 or less, 130 or less, 128 or less, 126 or less, 124 or less, 122 or less, 120 or less, 118 or less, 116 or less, 114 or less, or 112 or less.

The ratio (SD/A) of the average number (A) of the spacers and the above-mentioned standard deviation (SD) may be 0.1 or less. In another example, the ratio may be 0.09 or less, 0.08 or less, 0.07 or less, 0.06 or less, 0.05 or less, 0.04 or less, 0.03 or less, 0.02 or less, or 0.01 or less. The ratio (SD/A) may be 0 or more, or about 0.005 or more or so.

The average number (A) or the ratio (SD/A) may be optionally changed, and for example, the numerical value may be changed in consideration of the transmittance, the cell gap and/or the uniformity of the cell gap required in the device to which the substrate is applied, and the like.

In another example, when the surface of the base layer on which the irregularly disposed spacers are formed has been divided into two or more regions having the same area, the standard deviation of the number of the spacers in each unit region may be 2 or less.

Here, the meaning of the standard deviation and the specific examples thereof are as described above.

That is, in the example, when the base layer has been divided into at least two regions having the same area and the standard deviation of the number of the spacers present in each divided unit region has been obtained, the standard deviation thereof is 2 or less. In this case, the shape of each divided unit region is not particularly limited as long as the relevant unit regions are divided so as to have the same area, but it may be, for example, a triangular, square, or hexagonal region. In addition, in another example, the standard deviation in the above state may be 1.5 or less, 1 or less, or 0.5 or less, or may be 0 or more, 0.5 or more, 1 or more, or 1.5 or more.

Here, the number of unit regions is not particularly limited, but in one example, the base layer may be divided into two or more, four or more, six or more, eight or more, or ten or more regions having the same area. Here, since it means that the higher the number of the divided regions, the more uniform the density of the spacers is maintained, the upper limit of the number of divided regions is not particularly limited.

When the virtual square region with P, which is a normal pitch, as one side has been selected on the substrate on which the plurality of spacers are disposed so as to have regularity and irregularity simultaneously, the average number of spacers existing in the relevant region may be in a range of 0 to 4. In another example, the average number may be 3.5 or less, 3 or less, 2.5 or less, 2 or less, or 1.5 or less. Also, in another example, the average number may be 0.5 or more. Here, the number of square regions of which the length of one side is optionally designated as the normal pitch (P) is not particularly limited as long as it is two or more, but in one example, it may be selected as the number that the square regions are optionally selected so as not to overlap each other on the surface of the base layer, provided that the area occupied by the optionally selected region is about 10% or more, 20% or more, 30% or more, 40% or more, 50% or more, 60% or more, 70% or more, 80% or more, or 90% or more of the total area of the base layer.

The entire density of the plurality of spacers can be adjusted so that the ratio of the area occupied by the spacers is about 50% or less relative to the total area of the base layer. In another example, the ratio may be about 45% or less, about 40% or less, about 35% or less, about 30% or less, about 25% or less, about 20% or less, about 15% or less, about 10% or less, about 9.5% or less, 9% or less, 8.5% or less, 8% or less, 7.5% or less, 7% or less, 6.5% or less, 6% or less, 5.5% or less, 5% or less, 4.5% or less, 4% or less, 3.5% or less, 3% or less, 2.5% or less, 2% or less, or 1.5% or less. In another example, the ratio may be about 0.1% or more, 0.2% or more, 0.3% or more, 0.4% or more, 0.5% or more, 0.6% or more, 0.7% or more, 0.8% or more, 0.9% or more, or 0.95% or more.

When an optical device has been implemented by disposing a plurality of spacers on the base layer in the above form, the uniform optical characteristics can be ensured without causing the so-called moire phenomenon, while the spacers maintain the uniform pitch (cell gap) between the substrates.

The respective numerical values may be changed, if necessary, and for example, the numerical values may be changed in consideration of the transmittance, the cell gap and/or the uniformity of the cell gap required in the device to which the substrate is applied, and the like.

The plurality of spacers may be arranged such that their spacing normal distribution diagram represents a predetermined shape.

Here, the spacing normal distribution diagram is a distribution diagram showing the pitch between the spacers as the X-axis and the ratio of the spacers having the relevant pitch among all the spacers as the Y-axis, where the ratio of the spacers is a ratio obtained when the number of the entire spacer has been assumed to be 1.

An example of such a distribution diagram is shown in FIG. 4. The pitch in the description related to the spacing normal distribution diagram herein is also a length of sides in a triangle, a quadrangle or a hexagon, which is the above-mentioned closed figure.

The distribution diagram can be obtained using a known random number coordinate program, for example, a CAD, MATLAB or STELLA random number coordinate program or the like.

In one example, the plurality of spacers may be disposed such that a half height area in the distribution diagram is in a range of 0.4 to 0.95. In another example, the half height area may be 0.45 or more, 0.5 or more, 0.55 or more, 0.6 or more, 0.65 or more, 0.7 or more, or 0.85 or more. Also, in another example, the half height area may be 0.9 or less, 0.85 or less, 0.8 or less, 0.75 or less, 0.7 or less, 0.65 or less, 0.6 or less, 0.55 or less, or 0.5 or less.

The plurality of spacers may be arranged such that a ratio (FWHM/Pm) of the half height width (FWHM) to the average pitch (Pm) in the distribution diagram is 1 or less. In another example, the ratio (FWHM/Pm) may be 0.05 or more, 0.1 or more, 0.11 or more, 0.12 or more, or 0.13 or more. Also, in another example, the ratio (FWHM/Pm) is about 0.95 or less, about 0.9 or less, about 0.85 or less, about 0.8 or less, about 0.75 or less, about 0.7 or less, about 0.65 or less, about 0.6 or less, about 0.55 or less, about 0.5 or less, about 0.45 or less, or about 0.4 or less.

When at least 80% or more, 85% or more, 90% or more, or 95% or more of spacers have been selected to form a triangle, quadrangle or hexagon, which is the above-described closed figure, the above-mentioned average pitch (Pm) is an average of the lengths of the respective sides of the triangle, quadrangle or hexagon formed by the selected spacers. Here, the spacers are also selected so that the formed triangles, quadrangles or hexagons do not share vertexes with respect to each other.

The plurality of spacers may be disposed such that the half height width (FWHM) in the distribution diagram is in a range of 0.5 μm to 1,000 μm. In another example, the half height width (FWHM) may be about 1 μm or more, 2 μm or more, 3 μm or more, 4 μm or more, 5 μm or more, 6 μm or more, 7 μm or more, 8 μm or more, 9 μm or more, 10 μm or more, 11 μm or more, 12 μm or more, 13 μm or more, 14 μm or more, 15 μm or more, 16 μm or more, 17 μm or more, 18 μm or more, 19 μm or more, 20 μm or more, 21 μm or more, 22 μm or more, 23 μm or more, 24 μm or more, 27 μm or more, 30 μm or more, 35 μm or more, 40 μm or more, 45 μm or more, or 50 μm or more. In another example, the half height width (FWHM) may be about 900 μm or less, 800 μm or less, 700 μm or less, 600 μm or less, 500 μm or less, 400 μm or less, 300 μm or less, 200 μm or less, 150 μm or less, 100 μm or less, 90 μm or less, 80 μm or less, 70 μm or less, 60 μm or less, 50 μm or less, 40 μm or less, or 30 μm or less.

The plurality of spacers may be disposed such that the maximum height (Fmax) of the spacing normal distribution diagram is 0.006 or more and less than 1. In another example, the maximum height (Fmax) may be about 0.007 or more, about 0.008 or more, about 0.009 or more, or about 0.0095 or more, about 0.01 or more, or about 0.015 or more. Also, in another example, the maximum height (Fmax) may be about 0.9 or less, about 0.8 or less, about 0.7 or less, about 0.6 or less, about 0.5 or less, about 0.4 or less, about 0.3 or less, about 0.2 or less, about 0.1 or less, about 0.09 or less, about 0.08 or less, about 0.07 or less, about 0.06 or less, about 0.05 or less, about 0.04 or less, about 0.03 or less, or about 0.02 or less.

When an optical device has been implemented by disposing a plurality of spacers on to have the spacing normal distribution diagram in such a form, the uniform optical characteristics can be ensured without causing the so-called moire phenomenon, while the spacers maintain the uniform pitch (cell gap) between the substrates.

The concept of degree of irregularity is introduced for a plurality of spacers to be disposed so as to simultaneously have irregularity and regularity as above. Hereinafter, a method for designing the arrangement of the spacers having such a form will be described.

In order to achieve the arrangement of the spacers having the above-mentioned regularity and irregularity simultaneously, a step of starting from a normal arrangement state and relocating the spacers to have irregularity is performed.

Here, the normal arrangement state is a state where the plurality of spacers are disposed on the base layer such that a regular triangle, a square or a regular hexagon in which all sides have the same length can be formed. FIG. 5 is a state in which spacers are disposed to form the square as an example. The length P of one side of the square in this state may be equal to the above-mentioned normal pitch. In such an arrangement state, a circle region having a radius of a length proportional to the length P of one side is designated on the basis of a point where one spacer exists, and the program is set so that the one spacer can be randomly moved in the region. For example, FIG. 5 schematically shows a form in which the circle region having the radius of the length of 50% (0.5 P) relative to the length P is set and the spacer moves to any point in the region. The above-described arrangement can be achieved by applying such a movement to spacers of at least 80% or more, 85% or more, 90% or more, 95% or more, or 100% (all spacers).

In such a design method, the ratio for the length P which becomes the radius of the circle region may be defined as a degree of irregularity. For example, in the case shown in FIG. 5, the degree of irregularity is about 50%.

In one example, the degree of irregularity in the design manner may be about 5% or more, about 10% or more, about 15% or more, about 20% or more, about 25% or more, about 30% or more, about 35% or more, about 40% or more, about 45% or more, about 50% or more, about 55% or more, about 60% or more, or about 65% or more. In one example, the degree of irregularity may be about 95% or less, about 90% or less, about 85% or less, or about 80% or less.

The arrangement having the above-described irregularity and regularity simultaneously can be achieved by designing the arrangement of the spacers in the same manner as above and forming the spacers according to the designed arrangement.

Here, although the case where the normal state starts from the square has been exemplified, the normal state may be other figures such as a regular triangle or a regular hexagon, and in this case, the above-described arrangement can also be achieved.

The means for designing the arrangement of the spacers in the same manner as above is not particularly limited, and a known random number coordinate program such as, for example, a CAD, MATLAB, STELLA or Excel random number coordinate program can be used.

For example, after the arrangement of the spacers is first designed in the same manner as above, a mask having a pattern according to the relevant design and the like may be manufactured and such spacers may be implemented by a lithography or imprinting method and the like using the relevant mask.

The dimension of such spacers is not particularly limited, which may be selected within a known range. For example, the spacers may have a bottom cross-sectional area in a range of about 0.25 $\mu m^2$ to 1 $mm^2$, and a height in a range of about 0.5 $\mu m$ to 1 mm In another example, the bottom cross-sectional area may be about 0.5 $\mu m^2$ or more, 0.75 $\mu m^2$ or more, 1 $\mu m^2$ or more, 5 $\mu m^2$ or more, 10 $\mu m^2$ or more, 15 $\mu m^2$ or or more, or 20 $\mu m^2$ or more, or may also be 900000 $\mu m^2$ or less, 800000 $\mu m^2$ or less, 700000 $\mu m^2$ or less, 600000 $\mu m^2$ or less, 500000 $\mu m^2$ or less, 400000 $\mu m^2$ or less, 300000 $\mu m^2$ or less, 200000 $\mu m^2$ or less, 100000 $\mu m^2$ or less, 90000 $\mu m^2$ or less, 80000 $\mu m^2$ or less, 70000 $\mu m^2$ or less, 60000 $\mu m^2$ or less, 50000 $\mu m^2$ or less, 40000 $\mu m^2$ or less, 30000 $\mu m^2$ or less, 20000 $\mu m^2$ or less, 10000 $\mu m^2$ or less, 9000 $\mu m^2$ or less, 8000 $\mu m^2$ or less, 7000 $\mu m^2$ or less, 6000 $\mu m^2$ or less, 5000 $\mu m^2$ or less, 4000 $\mu m^2$ or less, 3000 $\mu m^2$ or less, 2000 $\mu m^2$ or less, 1000 $\mu m^2$ or less, 900 $\mu m^2$ or less, 800 $\mu m^2$ or less, 700 $\mu m^2$ or less, 600 $\mu m^2$ or less, 500 $\mu m^2$ or less, 400 $\mu m^2$ or less, 300 $\mu m^2$ or less, 200 $\mu m^2$ or less, 100 $\mu m^2$ or less, 90 $\mu m^2$ or less, 80 $\mu m^2$ or less, 70 $\mu m^2$ or less, 60 $\mu m^2$ or less, 50 $\mu m^2$ or less, 40 $\mu m^2$ or less, or 30 $\mu m^2$ or less.

The spacer can be formed using a known material and method. In one example, the spacer may be formed by comprising an ultraviolet curable resin. For example, the spacer can be formed by designing the regular irregularity in the above-described manner and curing an ultraviolet curable compound according to the desired arrangement in an imprinting or lithography method using a mask designed according to the designed contents, where the ultraviolet curable resin that is a cured product of the ultraviolet curable compound can form the spacer. The specific kind of the ultraviolet curable compound that can be used for forming the spacer is not particularly limited, and for example, an acrylate-based polymer or an epoxy-based polymer, and the like may be used, without being limited thereto.

The substrate of the present application may comprise, in addition to the base layer and the spacers, other elements required for driving the optical device. These elements are variously known, and typically, there is an electrode layer. In one example, the substrate may further comprise an electrode layer between the base layer and the spacers. As the electrode layer, a known material can be applied. For example, the electrode layer may comprise a metal alloy, an electrically conductive compound or a mixture of two or more thereof. Such a material can be exemplified by a metal such as gold, CuI, an oxide material such as ITO (indium tin oxide), IZO (indium zinc oxide), ZTO (zinc tin oxide), zinc oxide doped with aluminum or indium, magnesium indium oxide, nickel tungsten oxide, ZnO, $SnO_2$ or $In_2O_3$, a metal nitride such as gallium nitride, a metal selenide such as zinc selenide, a metal sulfide such as zinc sulfide, or the like. A transparent positive hole injecting electrode layer can also be formed by using a laminate of a metal thin film of Au, Ag or Cu, and the like, and a transparent material having high refractive index such as ZnS, $TiO_2$ or ITO.

The electrode layer may be formed by any means such as vapor deposition, sputtering, chemical vapor deposition or electrochemical means. Patterning of the electrode layer is also possible in a known manner without any particular limitation, and the electrode layer may be patterned, for example, through known photolithography or a process using a shadow mask or the like.

The substrate of the present application may further comprise an alignment film present on the base layer and the spacers.

Here, the kind of the alignment film formed on the base layer and the spacers is not particularly limited, where a known alignment film, for example, a known rubbing alignment film or a photo-alignment film can be applied.

A method of forming the alignment film on the base layer and the spacers and performing orientation treatment thereon is also in accordance with a known method.

The present application also relates to an optical device formed using such a substrate.

An exemplary optical device of the present application may comprise the substrate and a second substrate disposed opposite to the substrate and maintaining a gap with the substrate by the spacers in the substrate.

In the optical device, a light modulation layer may be present in a gap between two substrates. In the present application, the term light modulation layer may include all known types of layers capable of changing at least one characteristic among characteristics such as polarization states, transmittance, color tones and reflectance of incident light depending on purposes.

For example, the light modulation layer is a layer comprising a liquid crystal material, which may be a liquid crystal layer switched between a diffusion mode and a transparent mode by on-off of a voltage, for example, a vertical electric field or a horizontal electric field, a liquid crystal layer switched between a transparent mode and a blocking mode, a liquid crystal layer switched between a transparent mode and a color mode, or a liquid crystal layer switched between color modes of different colors.

Light modulation layers, for example, liquid crystal layers, capable of performing the above action are variously known. One exemplary light modulation layer is a liquid crystal layer used in a typical liquid crystal display. In another example, the light modulation layer may also be various types of so-called guest host liquid crystal layers, polymer dispersed liquid crystal layers, pixel-isolated liquid crystal layers, suspended particle devices or electrochromic devices, and the like.

The polymer dispersed liquid crystal layer (PDLC) is a superordinate concept including a PILC (pixel isolated liquid crystal), a PDLC (polymer dispersed liquid crystal), a PNLC (polymer network liquid crystal) or a PSLC (polymer stabilized liquid crystal), and the like. The polymer dispersed liquid crystal layer (PDLC) may comprise, for example, a liquid crystal region containing a polymer network and a liquid crystal compound dispersed in a state of being phase-separated from the polymer network.

The implementation manner or form of the light modulation layer is not particularly limited, and any known method may be employed without any limitations depending on purposes.

In addition, the optical device may further comprise additional known functional layers, such as a polarizing layer, a hard coating layer, and/or an antireflection layer, if necessary.

Advantageous Effects

The present application relates to a substrate on which spacers are disposed in a certain arrangement state and an optical device using such a substrate. In the present application, a plurality of spacers are irregularly disposed on a substrate depending on a predetermined rule, so that overall uniform optical characteristics can be ensured without causing a so-called moire phenomenon or the like, while the spacers maintain the uniform cell gap in the construction of the optical device.

BRIEF DESCRIPTION OF DRAWINGS

FIGS. 1 to 3 are diagrams for explaining pitches between spacers.
FIG. 4 is an example of a distribution diagram of spacers.
FIG. 5 is a diagram for explaining a method of implementing a degree of irregularity.
FIG. 6 is a diagram showing a spacer arrangement of Example 1.
FIG. 7 is a distribution diagram confirmed from the arrangement of Example 1.
FIG. 8 is an observation result of a moire phenomenon in the spacer arrangement of Example 1.
FIG. 9 is an observation result of a moire phenomenon in the spacer arrangement of the normal arrangement state.
FIG. 10 is a diagram showing a spacer arrangement of Example 2.
FIG. 11 is a distribution diagram confirmed from the spacer arrangement of Example 2.
FIG. 12 is an observation result of a moire phenomenon in the spacer arrangement of Example 2.
FIG. 13 is a diagram showing a spacer arrangement of Example 3.
FIG. 14 is a distribution diagram confirmed from the spacer arrangement of Example 3.
FIG. 15 is an observation result of a moire phenomenon in the spacer arrangement of Example 3.
FIG. 16 is a result of evaluating the appearance of the device to which the substrate of Example 3 is applied.
FIG. 17 is a distribution diagram confirmed from the spacer arrangement of Example 4.
FIG. 18 is an observation result of a moire phenomenon in the spacer arrangement of Example 4.
FIG. 19 is a result of evaluating the appearance of the device to which the substrate of Example 4 is applied.
FIG. 20 is an observation result of a moire phenomenon in the spacer arrangement of Comparative Example 1.
FIG. 21 is a result of evaluating the appearance of the device to which the substrate of Comparative Example 1 is applied.
FIG. 22 is an observation result of a moire phenomenon in the spacer arrangement of Comparative Example 2.
FIG. 23 is a result of evaluating the appearance of the device to which the substrate of Comparative Example 2 is applied.
FIG. 24 is an observation result of a moire phenomenon in the spacer arrangement of Comparative Example 3.
FIG. 25 is a result of evaluating the appearance of the device to which the substrate of Comparative Example 3 is applied.

MODE FOR INVENTION

Hereinafter, the present application will be specifically described by way of examples, but the scope of the present application is not limited by the following examples.

EXAMPLE 1

Design of Spacer Arrangement

A spacer arrangement pattern with a degree of irregularity of about 10% was designed using a random number coordinate generating program (CAD) in the following manner. First, a state where 100 spacers were disposed on a base layer having a total area of about 10 mm at a constant interval (normal pitch) of 127 μm was assumed, as shown in FIG. 5 (normal arrangement state). At this time, the cross-sectional area of the bottom of the individual spacers was about 27 μm and the height was about 10 μm. Then, in a square formed by selecting four spacers as in FIG. 5, a program was set so that individual spacers were randomly moved in a circle region having a radius (0.1 P) of 10% of the normal pitch, based on each spacer, and the individual spacers were moved to form a spacer arrangement pattern.

FIG. 6 is an example of a spacer arrangement designed as above. As shown in FIG. 6, when four spacers were selected so that a quadrangle as a closed figure was formed in the arrangement of the spacers and the length of each side was measured, at least one of the lengths of the sides of the quadrangle was different. In addition, the minimum length of all the side lengths of the quadrangle as the closed figure was about 87 μm, and the maximum length was about 113 μm. In FIG. 6, when 12 square regions having a length of 10 times (10 P) of the normal pitch (P) as one side were selected so that the regions did not overlap each other, the average number of spacers in each square region was 100 and the standard deviation was about 0. Furthermore, when the surface of the base layer shown in FIG. 6 was divided into four rectangular regions having the same area, the average number of spacers in each rectangular region was 24.1 and the standard deviation was about 1.7. FIG. 7 was a spacing normal distribution diagram of the spacers having the same arrangement as above, where the half height area in the distribution diagram was about 0.71, the half height width (FWHM) was about 14.19, the average pitch (Pm) was about 127 μm, and the maximum height (Fmax) was about 0.095.

Formation of Spacers

As the base layer (100 in FIG. 10), a base layer was used, in which a crystalline ITO (indium tin oxide) layer as an electrode layer was formed on a PC (polycarbonate) film. Although spacers were formed on the base layer in accordance with a conventional method of forming column spacers, the substrate was produced by forming spacers so that the arrangement followed the designed manner. The occurrence of the moire phenomenon was evaluated by a method of placing the substrate thus produced on a general commercial monitor. FIG. 8 is a result of confirming whether or not the moire phenomenon evaluated in the above method occurs, and FIG. 9 is a result of measurement with respect to the substrate on which spacers are formed according to the above-mentioned normal arrangement state. It can be confirmed from the results of FIGS. 8 and 9 that the occurrence of the moire phenomenon can be suppressed by controlling the arrangement state of the spacers.

EXAMPLE 2

The spacer arrangement was designed in the same manner as in Example 1, provided that the spacer arrangement was designed so that the degree of irregularity was 50% (the program was set so that the individual spacers were randomly moved in a circle region having a radius (0.5 P) of 50% of the normal pitch and the individual spacers were moved). In addition, the minimum length of all the sides of the quadrangle as the closed figure was about 36 μm, and the maximum length was about 164 μm.

FIG. 10 is an example of a spacer arrangement designed as above. As shown in FIG. 10, when four spacers were selected so that a quadrangle as a closed figure was formed in the arrangement of the spacers and the length of each side was measured, at least one of the lengths of the sides of the quadrangle was different. In addition, in FIG. 10, when 12 square regions having a length of 10 times (10 P) of the normal pitch (P) as one side were selected so that the regions did not overlap each other, the average number of spacers in each square region was 100 and the standard deviation was about 0. Furthermore, when the surface of the base layer shown in FIG. 10 was divided into four rectangular regions having the same area, the average number of spacers in each rectangular region was 24.4 and the standard deviation was about 1.2. FIG. 11 was a spacing normal distribution diagram of the spacers having the same arrangement as above, where the half height area in the distribution diagram was about 0.68, the half height width (FWHM) was about 53.58, the average pitch (Pm) was about 127 μm, and the maximum height (Fmax) was about 0.019.

FIG. 12 is a result of evaluating whether or not the moire phenomenon occurs in the same manner as in Example 1, using the substrate formed in the above manner, and it can be confirmed that the occurrence of the moire phenomenon is suppressed as in Example 1.

EXAMPLE 3

The spacer arrangement was designed in the same manner as in Example 1, provided that the spacer arrangement was designed so that the degree of irregularity was 70% (the program was set so that the individual spacers were randomly moved in a circle region having a radius (0.7 P) of 70% of the normal pitch and the individual spacers were moved). In addition, the minimum length of all the sides of the quadrangle as the closed figure was about 11 μm, and the maximum length was about 189 μm.

FIG. 13 is an example of a spacer arrangement designed as above. As shown in FIG. 13, when four spacers were selected so that a quadrangle as a closed figure was formed in the arrangement of the spacers and the length of each side was measured, at least one of the lengths of the sides of the quadrangle was different. In addition, in FIG. 13, when 12 square regions having a length of 10 times (10 P) of the normal pitch (P) as one side were selected so that the regions did not overlap each other, the average number of spacers in each square region was 99.5 and the standard deviation was about 0.9. Furthermore, when the surface of the base layer shown in FIG. 13 was divided into four rectangular regions having the same area, the average number of spacers in each rectangular region was 23.1 and the standard deviation was about 1.7. FIG. 14 was a spacing normal distribution diagram of the spacers having the same arrangement as above, where the half height area in the distribution diagram was about 0.64, the half height width (FWHM) was about 77.09, the average pitch (Pm) was about 127 μm, and the maximum height (Fmax) was about 0.016.

FIG. 15 is a result of evaluating whether or not the moire phenomenon occurred in the same manner as in Example 1, using the substrate formed in the above manner, and it can be confirmed that the occurrence of the moire phenomenon was suppressed as in Example 1.

FIG. 16 is a photograph evaluating whether or not appearance defects occurred in the same manner as in Example 1 with respect to Example 3.

EXAMPLE 4

The spacer arrangement was designed in the same manner as in Example 1, provided that the spacer arrangement was designed so that the degree of irregularity was 70% (the program was set so that the individual spacers were randomly moved in a circle region having a radius (0.7 P) of 70% of the normal pitch and the individual spacers were moved). In addition, the minimum length of all the sides of the quadrangle as the closed figure was about 59 μm, and the maximum length was about 447 μm.

The spacer arrangement designed as above was approximately similar to that shown in FIG. 13. That is, as shown in FIG. 13, even in the case of Example 4, when four spacers were selected so that a quadrangle as a closed figure was formed in the arrangement of the spacers and the length of each side was measured, at least one of the lengths of the sides of the quadrangle was different. In addition, in the form as shown in FIG. 13, when 12 square regions having a length of 10 times (10 P) of the normal pitch (P) as one side were selected so that the regions did not overlap each other, the average number of spacers in each square region was 99.5 and the standard deviation was about 0.9. Furthermore, when the surface of the base layer shown in FIG. 13 was divided into four rectangular regions having the same area, the average number of spacers in each rectangular region was 23.1 and the standard deviation was about 1.7. FIG. 17 was a spacing normal distribution diagram of the spacers having the same arrangement as above, where the half height area in the distribution diagram was about 0.64, the half height width (FWHM) was about 181.42, the average pitch (Pm) was about 277 μm, and the maximum height (Fmax) was about 0.0061.

FIG. 18 is a result of evaluating whether or not the moire phenomenon occurred in the same manner as in Example 1, using the substrate formed in the above manner, and it can be confirmed that the occurrence of the moire phenomenon was suppressed as in Example 1.

FIG. 19 is a photograph evaluating whether or not appearance defects occurred in the same manner as in Example 1 with respect to Example 4.

COMPARATIVE EXAMPLE 1

The spacer arrangement was designed in the same manner as in Example 1, provided that the spacer arrangement was designed so that the degree of irregularity was 70% (the program was set so that the individual spacers were randomly moved in a circle region having a radius (0.7 P) of 70% of the normal pitch and the individual spacers were moved). In addition, the minimum length of all the sides of the quadrangle as the closed figure was about 89 μm, and the maximum length was about 616 μm.

The spacer arrangement designed as above was approximately similar to that shown in FIG. 13. That is, as shown in FIG. 13, even in the case of Comparative Example 1, when four spacers were selected so that a quadrangle as a closed figure was formed in the arrangement of the spacers and the length of each side was measured, at least one of the lengths of the sides of the quadrangle was different. In addition, when 12 square regions having a length of 10 times (10 P) of the normal pitch (P) as one side were selected so that the regions did not overlap each other, the average number of spacers in each square region was 99.5 and the standard deviation was about 0.9. Furthermore, when the surface of the base layer shown in FIG. 13 was divided into four rectangular regions having the same area, the average number of spacers in each rectangular region was 23.1 and the standard deviation was about 1.7.

FIG. 20 is a result of evaluating whether or not the moire phenomenon occurred in the same manner as in Example 1, using the substrate formed in the above manner, and it can be confirmed that the occurrence of the moire phenomenon was suppressed as in Example 1.

FIG. 21 is a photograph evaluating whether or not appearance defects occur in the same manner as in Example 1 with respect to Comparative Example 1, and it can be confirmed from the drawing that large defects in appearance are generated.

COMPARATIVE EXAMPLE 2

The spacer arrangement was designed in the same manner as in Example 1, provided that the spacer arrangement was designed so that the degree of irregularity was 70% (the program was set so that the individual spacers were randomly moved in a circle region having a radius (0.7 P) of 70% of the normal pitch and the individual spacers were moved). In addition, the minimum length of all the sides of the quadrangle as the closed figure was about 119 μm, and the maximum length was about 786 μm.

The spacer arrangement designed as above was approximately similar to that shown in FIG. 13. That is, as shown in FIG. 13, even in the case of Comparative Example 2, when four spacers were selected so that a quadrangle as a closed figure was formed in the arrangement of the spacers and the length of each side was measured, at least one of the lengths of the sides of the quadrangle was different. In addition, when 12 square regions having a length of 10 times (10 P) of the normal pitch (P) as one side were selected so that the regions did not overlap each other, the average number of spacers in each square region was 99.5 and the standard deviation was about 0.9. Furthermore, when the surface of the base layer shown in FIG. 27 was divided into four rectangular regions having the same area, the average number of spacers in each rectangular region was 23.1 and the standard deviation was about 1.7.

FIG. 22 is a result of evaluating whether or not the moire phenomenon occurs in the same manner as in Example 1, using the substrate formed in the above manner, and it can be confirmed that the occurrence of the moire phenomenon is suppressed as in Example 1.

FIG. 23 is a photograph evaluating whether or not appearance defects occur in the same manner as in Example 1 with respect to Comparative Example 1, and it can be confirmed from the drawing that large defects in appearance are y generated.

COMPARATIVE EXAMPLE 3

The spacer arrangement was designed in the same manner as in Example 1, provided that the spacer arrangement was designed so that the degree of irregularity was 70% (the program was set so that the individual spacers were randomly moved in a circle region having a radius (0.7 P) of 70% of the normal pitch and the individual spacers were moved). In addition, the minimum length of all the sides of the quadrangle as the closed figure was about 134 μm, and the maximum length was about 872 μm.

The spacer arrangement designed as above was approximately similar to that shown in FIG. 13. That is, as shown in FIG. 13, even in the case of Comparative Example 3, when four spacers were selected so that a quadrangle as a closed figure was formed in the arrangement of the spacers and the length of each side was measured, at least one of the lengths of the sides of the quadrangle differed. In addition, in FIG. 31, when 12 square regions having a length of 10 times (10 P) of the normal pitch (P) as one side were selected so that the regions did not overlap each other, the average number of spacers in each square region was 99.5 and the standard deviation was about 0.9. Furthermore, when the surface of the base layer shown in FIG. 31 was divided into four rectangular regions having the same area, the average number of spacers in each rectangular region was 23.1 and the standard deviation was about 1.7.

FIG. 24 is a result of evaluating whether or not the moire phenomenon occurs in the same manner as in Example 1, using the substrate formed in the above manner, and it can be confirmed that the occurrence of the moire phenomenon is suppressed as in Example 1.

FIG. 25 is a photograph evaluating whether or not appearance defects occur in the same manner as in Example 1 with respect to Comparative Example 1, and it can be confirmed from the drawing that large defects in appearance are generated.

The invention claimed is:

1. A substrate comprising:
   a base layer; and
   a plurality of spacers present on the base layer,
   wherein three, four or six spacers of the plurality of spacers are optionally selected, provided that when the selected spacers have been selected to form a triangle, a quadrangle or a hexagon, which is a closed figure, that other spacers are not present therein, the spacers are disposed so that at least one of lengths of sides in the triangle, the quadrangle or the hexagon differs, each length of a side being defined as a pitch between adjacent spacers,
   when a normal pitch of the plurality of spacers is P, a standard deviation of numbers of the spacers in a square region having 10 P as one side length is 2 or less, and
   a maximum length of the lengths of the sides in the triangular, the quadrangle or the hexagon is 600 μm or less,
   wherein a ratio of a standard deviation (SD) of spacers in the square region to an average number (A) of spacers in the square region and is from 0.005 to 0.1,
   wherein the plurality of spacers are arranged such that the pitch between adjacent spacers is represented by a spacing normal distribution diagram, wherein the pitch between adjacent spacers is represented on an x-axis of the diagram and a ratio of a number of occurrences of a given pitch between adjacent spacers relative to a total number of pitches between adjacent spacers is represented on the y-axis of the diagram, wherein a sum of all ratios of a given pitch between adjacent spacers is 1, and
   wherein a full width at the half maximum height (FWHM) of the spacing normal distribution diagram is 10 μm or more and a maximum height of the spacing normal distribution diagram is 0.5 or less.

2. The substrate according to claim 1, wherein the normal pitch P is in a range of 50 μm to 600 μm.

3. The substrate according to claim 1, wherein the ratio of SD to A is 0.005 to 0.09.

4. The substrate according to claim 1, wherein the average number (A) of spacers is in a range of 80 to 150.

5. The substrate according to claim 1, wherein the base layer is an organic base layer or an inorganic base layer.

6. The substrate according to claim 1, wherein a ratio (FWHM/P) of the full width at half maximum height (FWHM) of the spacing normal distribution diagram of the plurality of spacers to the pitch (P) is 1 or less.

7. The substrate according to claim 1, wherein the full width at half maximum height (FWHM) of the spacing normal distribution diagram of the plurality of spacers is in a range of 10 μm to 1,000 μm.

8. The substrate according to claim 1, wherein the maximum height (Fmax) of the spacing normal distribution diagram of the plurality of spacers is 0.006 or more and 0.5 or less.

9. The substrate according to claim 1, wherein the number of spacers in a virtual square region, having P as one side, selected on the surface of the base layer is in a range of 0 to 4.

10. The substrate according to claim 1, wherein a ratio of the area occupied by the plurality of spacers relative to the total area of the base layer is 50% or less.

11. An optical device comprising the substrate according to claim 1 and a second substrate disposed opposite to the substrate and maintaining a gap with the substrate by the spacers in the substrate.

12. The optical device according to claim 11, wherein a liquid crystal material is present in the gap between the substrates.

13. The substrate according to claim 1, wherein a ratio of sides having the same length in the triangle, the quadrangle or the hexagon, is less than 80% of all sides.

14. The substrate according to claim 1, wherein a ratio of sides having the same length in the triangle, the quadrangle or the hexagon, is less than 67% of all sides.

15. The substrate according to claim 1, wherein a ratio of sides having the same length in the triangle, the quadrangle or the hexagon, is less than 40% of all sides.

16. A substrate, comprising:
    a base layer; and
    a plurality of spacers present on the base layer,
    wherein three, four or six spacers of the plurality of spacers are optionally selected, provided that when the selected spacers have been selected to form a triangle, a quadrangle or a hexagon, which is a closed figure, that other spacers are not present therein, the spacers are disposed so that at least one of lengths of sides in the triangle, the quadrangle or the hexagon differs, each length of a side being defined as a pitch between adjacent spacers,
    when a surface of the base layer has been divided into two or more square regions having the same area, a standard deviation of a number of the spacers in each square region is from 1 to 2, and
    a maximum length of the lengths of the sides in the triangular, the quadrangle or the hexagon is 600 μm or less,
    wherein the plurality of spacers are arranged such that the pitch between adjacent spacers is represented by a spacing normal distribution diagram, wherein the pitch between adjacent spacers is represented on an x-axis of the diagram and a ratio of a number of occurrences of a given pitch between adjacent spacers relative to a total number of pitches between adjacent spacers is represented on the y-axis of the diagram, wherein a sum of all ratios of adjacent spacers having a given pitch is 1,
    and
    wherein a full width at half maximum height (FWHM) of the spacing normal distribution diagram is 10 μm or more and a maximum height of the spacing normal distribution diagram is 0.5 or less.

17. A substrate comprising:
    a base layer; and
    a plurality of spacers present on the base layer,
    wherein three, four or six spacers of the plurality of spacers are optionally selected, provided that when the selected spacers have been selected to form a triangle, a quadrangle or a hexagon, which is a closed figure, that other spacers are not present therein, the spacers are disposed so that at least one of lengths of sides in the triangle, the quadrangle or the hexagon differs, each length of a side being defined as a pitch between adjacent spacers, wherein a maximum length of the lengths of the sides in the triangular, the quadrangle or the hexagon is 600 μm or less, wherein, when a normal pitch of the plurality of spacers is P, a standard deviation of numbers of the spacers in a square region having 10 P as one side length is 2 or less, wherein a ratio of a standard deviation (SD) of spacers in the square region having 10 P as one side length to an average number (A) of spacers in the square region having 10 P as one side length is from 0.005 to 0.1, wherein, when a surface of the base layer has been divided into two or more square regions having the same area, a standard deviation of a number of the spacers in each of the square regions having the same area is from 1 to 2, wherein the plurality of spacers are arranged such that the pitch between adjacent spacers is represented by a spacing normal distribution diagram, wherein the pitch between adjacent spacers is represented on an x-axis of the diagram and a ratio of a number of occurrences of a given pitch between adjacent spacers relative to a total number of pitches between adjacent spacers is represented on the y-axis of the diagram, wherein a sum of all ratios of a given pitch between adjacent spacers is 1, and wherein a full width at the half maximum height (FWHM) of the spacing normal distribution diagram is 10 μm or more and a maximum height of the spacing normal distribution diagram is 0.5 or less.

\* \* \* \* \*